United States Patent [19]

Bakula et al.

[11] 4,340,932

[45] Jul. 20, 1982

[54] DUAL MAPPING MEMORY EXPANSION UNIT

[75] Inventors: Richard E. Bakula, Indialantic; Dennis L. Maly; James H. Weemhoff, both of Melbourne, all of Fla.

[73] Assignee: Harris Corporation, Cleveland, Ohio

[21] Appl. No.: 906,830

[22] Filed: May 17, 1978

[51] Int. Cl.[3] .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,893,084 | 7/1975 | Kotok et al. | 364/200 |
| 3,938,096 | 2/1976 | Brown et al. | 364/200 |
| 4,037,214 | 7/1977 | Birney et al. | 364/200 |
| 4,042,911 | 8/1977 | Bourke et al. | 364/200 |

OTHER PUBLICATIONS

Structured Computer Organization; Andrew Tanenbaum, 1976, pp. 85-87; and pp. 250-256.
Operating System; Madnick, 1974, pp. 130-134.

*Primary Examiner*—James D. Thomas
*Assistant Examiner*—David Y. Eng
*Attorney, Agent, or Firm*—Craig and Antonelli

[57] ABSTRACT

In a unified bus data processing system, a memory expansion unit is connected to the bus to convert bus addresses into addresses in a physical memory which may be many times larger than the maximum size that the bus would have been capable of addressing previously. Thus, the memory expansion unit provides directly addressable memory locations which serve to expand the range of physical addresses allocated to the bus by selectively connecting a plurality of expansion memory units to said bus. The memory expansion unit is programmed to convert groups of bus addresses into the same size group of addresses anywhere in physical memory. Until the memory expansion unit is programmed, physical memory is directly addressable by the central processing unit by applying the appropriate bus address and the normal control signals thereto. The memory expansion unit can also perform a dual mapping function by allocating the expansion memory space differently for the central processor unit than for the other devices connected to the bus. Such control and memory expansion is made available while also retaining the possibility of partial physical memory space on the bus for a portion of the bus address space.

22 Claims, 18 Drawing Figures

BYPASS MODE

1K PAGE SIZE MODE

2K PAGE SIZE MODE

4K PAGE SIZE MODE

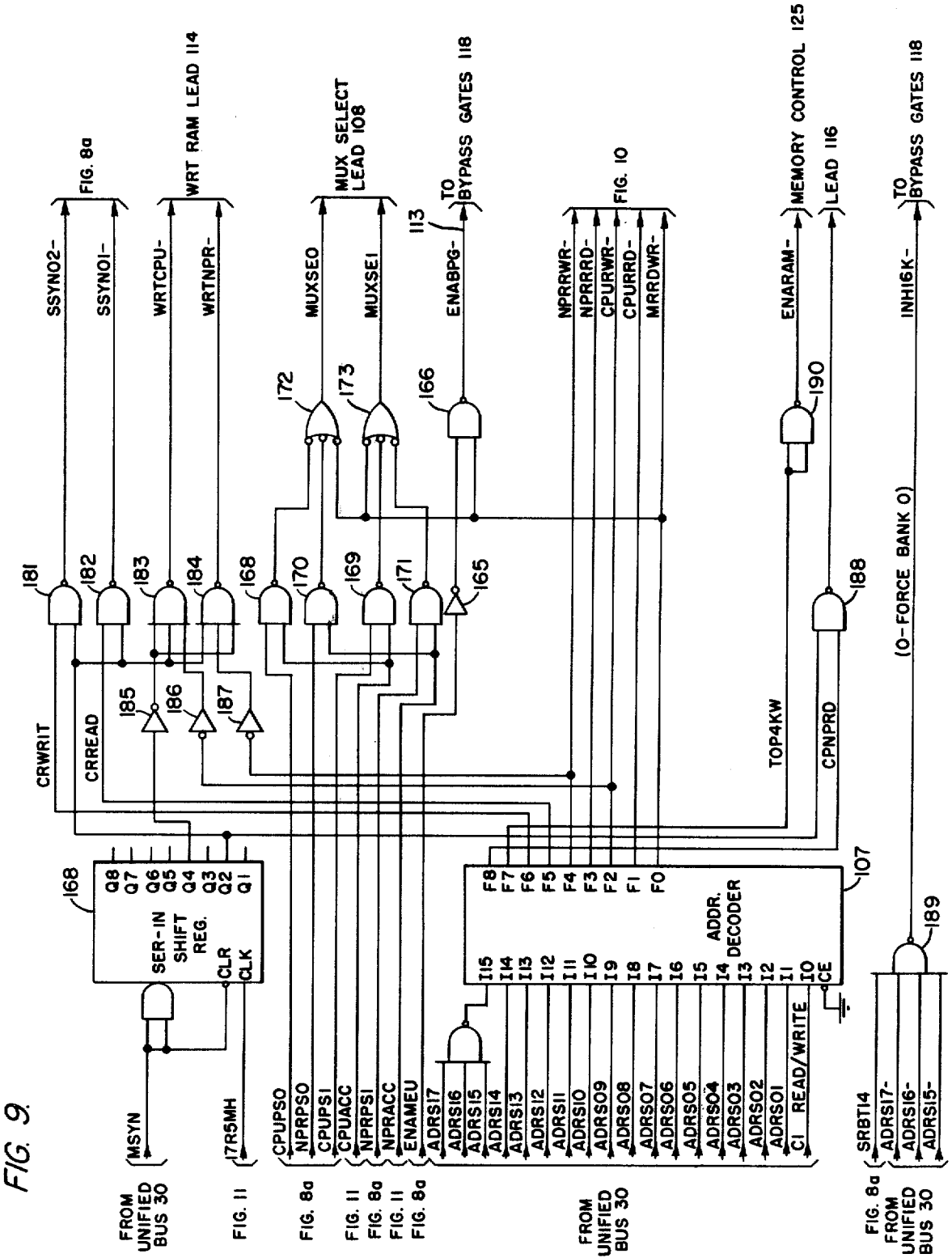

DUAL MAPPING MEMORY EXPANSION UNIT

BACKGROUND OF THE INVENTION

1. Cross-references to Related Patents and Publications

The following references, including patents and publications, describe aspects of a data processing system which are particularly adapted for utilizing this invention.
- (a) U.S. Pat. No. 3,710,324 issued Jan. 9, 1973, to Cohen et al, and entitled "Data Processing System";
- (b) U.S. Pat. No. 3,854,126 issued Dec. 10, 1974, to Gray et al, and entitled "Circuit for Converting Virtual Addresses to Physical Addresses";
- (c) *PDP*-11 *Peripherals and interfacing Handbook*, Digital Equipment Corporation, 1971.

2. Field of the Invention

The present invention relates in general to data processing systems, and more particularly, to a method and means for expanding the memory capability of such systems with the ability to provide for different expansion memory mapping for CPU and peripherals.

3. Prior Art

A digital computer system normally includes a central processor unit, a random access memory unit and a number of peripheral units. These units may be interconnected by a unified bus, as described in the above-identified U.S. Pat. No. 3,710,324. With unified bussing architecture, all devices, including the central processor, are connected in parallel to the bus. Any device, such as the central processing unit or a peripheral unit, can dynamically request control of the bus to transfer information to another device using an approach based on real and virtual memory addresses, as described in the above-identified U.S. Pat. No. 3,854,126. Thus, the central processor unit can look on its peripherals as if they were locations in memory and can operate on them using the same set of instructions used to operate on memory.

Devices communicate on the unified bus in a master-slave relationship. During any bus operation, one device has control of the bus. The device in control, called the master, communicates with another device, called the slave. Thus, the central processor unit as the master may send control information to a selected peripheral unit which then could obtain the bus as a master to communicate with another peripheral unit as a slave.

The unified bus is used by the central processor unit and all peripheral units connected thereto. A priority structure determines which device has control of the bus at any given instant of time. Communication on the unified bus can be asynchronous and interlocked between devices. For each control signal issued by the master, there is a response from the slave.

In most data processing systems, the address fields of an instruction are of fixed length, that is, each address in the instruction has a predetermined number of bits, digits, or characters to specify a single address location in the memory. The length of the address field is whatever is required to accommodate the maximum memory capacity of the machine. In a unified bus system, each device has a unique address on the bus. Thus, for example, a memory connected to the bus will be assigned a certain set of successive addresses in a block of available addresses. Similarly, other blocks of addresses may be assigned to random access memory units, magnetic disc units, and other peripheral units. However, with such an arrangement, the number of devices including memory units and peripheral units which may be connected to the bus are limited by the maximum number of address bits available in the unified bus of the data processing system.

In a data processing system in which the address field is made up of sixteen bits, it is apparent that there will be only $64K (K = 1024_{10})$ available addresses and these addresses can identify directly no more than 64K 8-bit byte locations or 32K two byte word locations. However, to facilitate the storage of information and reduce transfer times, it is often desirable to provide more than 64K byte storage locations in a memory, but to do so requires expansion of the address field or additional coding within the instruction. To solve this problem, a technique known as "virtual addressing" has been used. The term virtual addressing denotes a form of accessing of a central memory wherein the absolute address of information or data to be accessed from the central memory is formed by combining at least one other address. For example, the absolute address could be formed through use of a program address combined with an address indicative of the region of the central memory from which desired information is to be retrieved. However, in a system using virtual addressing, further memory expansion without expansion of the address bits in the bus is still a problem.

In order to facilitate the transfer of programs and data to or from a memory unit, data processing systems normally include some means for arbitrarily dividing the available memory space of any memory unit connected to the unified bus into segments or units commonly referred to as "pages". Each page typically has a fixed number of memory locations; however, from the point of view of efficiency in the use of the available memory space, it is often desirable to use a different paging system in mapping the available memory space for use by the central processing unit than is used by the peripheral units connected to the unified bus. On the other hand, it is absolutely essential that the data processing system control the allocation of available memory space in such a way as to avoid any possibility of confusion in the address of a selected location in memory by the central processing unit and a given peripheral unit.

Therefore, the object of this invention is to provide a memory expansion unit which may be used with a unified bus data processing system of the type described.

Another object of the present invention is to provide a data processing system employing virtual addressing for address expansion to which additional directly-addressable memory capacity may be added without expansion of the address field.

Yet another object of the present invention is to provide a data processing system of the type described including a memory expansion unit having the capability of providing for different expansion memory mapping for the central processing unit and the peripherals attached to the unified bus and further to provide for different page sizes.

SUMMARY

In accordance with this invention, there is provided a data processing system including a unified bus in which the devices connected to the bus are assigned preselected blocks of the available address space, and a memory expansion unit is connected in the manner of a peripheral device to the unified bus for effecting expansion of the addresses allocated to that device. One or a plurality of expansion memories are connected to the memory expansion unit, which serves to map portions of the usable unified bus address space allocated to the memory expansion unit into any part of the larger memory provided by the expansion memories. In addition, the memory expansion unit is capable of recognizing whether the central processing unit or a peripheral device is accessing memory and applies a different mapping table and/or a different page size to each requesting source. The dual mapping approach thereby allows the central processing unit to use a different paging system than is used by the peripheral units.

These and other objects, features, and advantages of the present invention will become more apparent from the following detailed description of a preferred embodiment of the present invention when taken in conjunction with the accompanying drawings.

BRIEF DESCRIPTION OF THE DRAWINGS

FIGS. 9 and 10 are schematic circuit diagrams of the operation controller along with the address decoder;

DETAILED DESCRIPTION OF THE INVENTION

While the present invention is applicable to unified bus systems in general, the preferred embodiment of this invention will be described in connection with the PDP-11 family of systems, as manufactured by Digital Equipment Corporation, for purposes of illustration. The details of this commercially-available data processing system are well documented, as indicated by the foregoing references, and the construction and manner of operation of the unified bus is described with particularity in the above-referenced U.S. Pat. No. 3,710,324.

Figure 1:
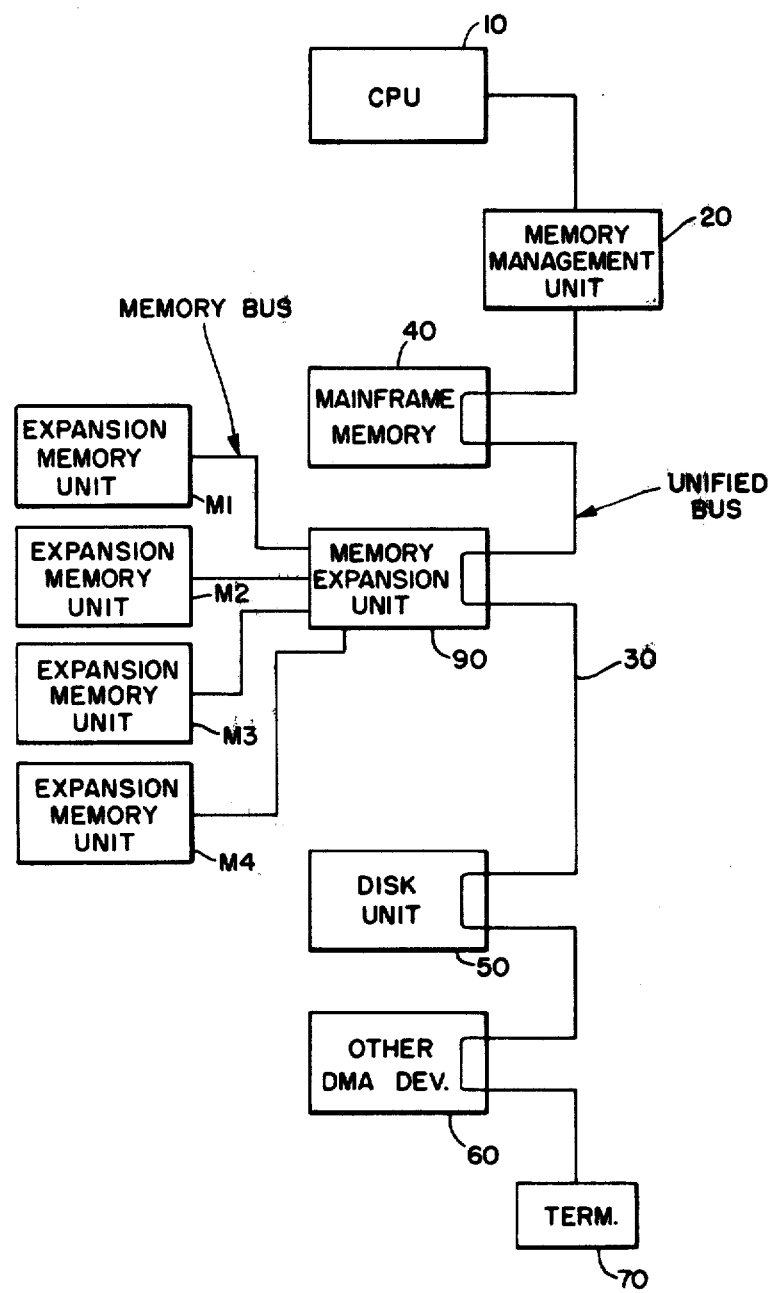
FIG. 1 is a basic block diagram of a data processing system embodying the memory expansion unit of the present invention.

Referring to FIG. 1, a central processor unit 10 is connected through a memory management unit 20 to a unified bus 30, to which are connected in parallel a main frame memory 40, one or more magnetic disc memory units 50 and other peripheral units 60. The end of the bus 30 is connected to termination 70.

With each of the devices 40, 50 and 60 connected in parallel to the unified bus 30, the central processor unit 10 can look on these units as if they are physically addressable storage locations and can access these units by applying a unique address within an allocated block of addresses assigned to that unit onto the unified bus 30. The number of storage locations which the central processor unit 10 can address directly is therefore limited by the number of bits in the address field of the bus. If the bus is designed to operate on an address field containing sixteen bits, then only $2^{16}$ bytes can be addressed directly.

The memory management unit 20, as described more particularly in the above-identified U.S. Pat. No. 3,854,126, facilitates multi-programming which may require $2^{18}$ bytes or more by converting the sixteen bit virtual address provided by the central processing unit into a physical address and expanding the virtual address to eighteen bits so as to provide for an increased amount of addressable memory space. The memory management unit 20 thus constitutes an address conversion unit; however, it also controls paging and tailors each page to the program it contains to minimize wasted core space for unused page portions while minimizing the number of memory transfers.

In accordance with this invention, a memory expansion unit 90 is also connected to the unified bus 30 in parallel with the other units and in such a way that the bus 30 is unbroken in passing therethrough in the same manner as the other units. The memory expansion unit 90 provides for further expansion of the address space allocated to that unit on the unified bus 30. In this regard, the unified bus address space allocated to the unit 90 is divided into N pages of length P, where N = 128 K/P (K = 1024). Thus, by affecting a further address expansion of the block of addresses received on the bus 30, a plurality of expansion memories M1-M4, each one of which may have a memory capacity of 128K, approximately equal to the total address space on the unified bus 30 allocated to the memory expansion unit 90 as a peripheral unit, may be connected to the bus 30 via the memory expansion unit 90. This is accomplished by expanding the eighteen bit address on the bus 30 to a twenty bit address, the two most significant bits of which serve to select one of the expansion memory units M1-M4. In this way, additional memory capacity may be obtained without expansion of the address field.

On the other hand, the memory expansion unit 90 may utilize a smaller portion of the unified bus address space allocated to the unit 90, while the remaining portion of the allocated address space is used for memory located directly on the unified bus, if desired. The 512K words of physical memory provided by the four expansion memory units M1-M4 as a whole are divided into 16,384 blocks of 32 words each. Thus, virtual memory pages may be mapped into the physical memory locations provided in the expansion memory units M1-M4 starting at the beginning of any 32 word block (LSB address bits = 000000).

While the system illustrated in FIG. 1 includes a memory management unit 20 located between the central processing unit 10 and the unified bus 30 for purposes of converting virtual addresses received from the CPU to physical addresses on the unified bus 30, it will become apparent from the detailed description of the memory expansion unit 90 and its operation that the present invention is not restricted to a system which utilizes, relies upon, or in which there is included at all, any means for converting virtual addresses received from the central processing unit into physical addresses for application to the unified bus, such as the memory management unit 20. In absence of a memory management unit 20, the memory expansion unit 90 merely converts its allocated block of addresses on the unified bus 30, as received from the central processing unit 10, into the expanded addresses related to the physical memory provided in the expansion memory unit connected thereto. However, in describing a preferred embodiment of the present invention, it will be assumed that the central processing unit 10 provides a sixteen bit virtual address to the memory management unit 20, which in turn converts these virtual addresses into an eighteen bit physical address which is applied to the unified bus 30.

Figure 2:
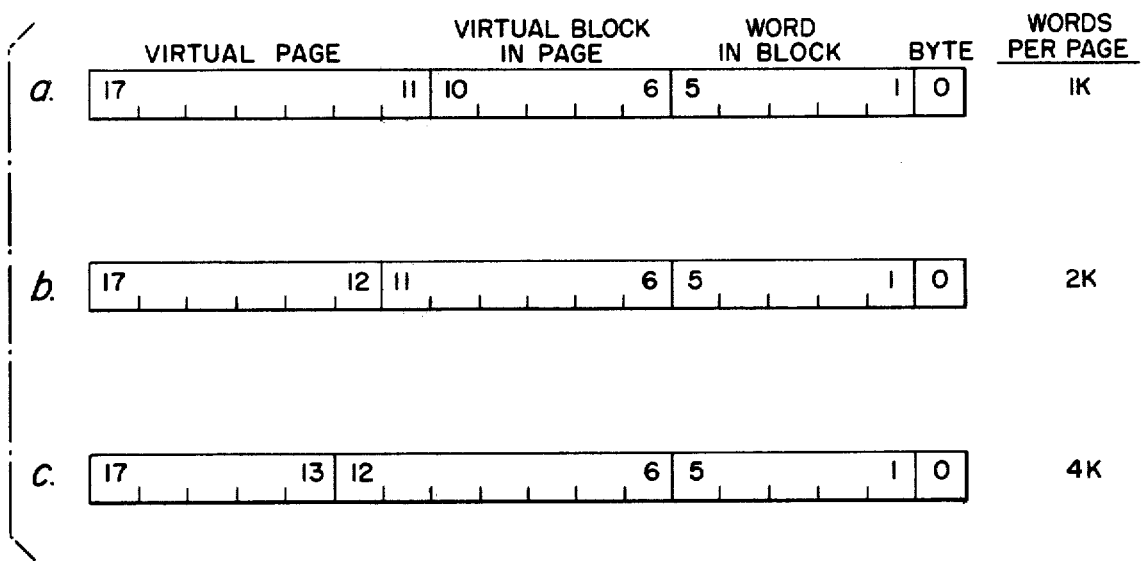
FIGS. 2a, 2b, and 2c illustrate different unified bus address bit groupings utilized by the present invention.

The eighteen bit address received by the unified bus is divided into functional groups of bits, as shown in FIGS. 2a–2c, by the memory expansion unit 90. As is apparent from the drawing, the groupings of bits in each of FIGS. 2a–2c are slightly different depending upon the page size selected. In this regard, as the page size increases, for a fixed amount of memory space, the number of virtual pages decreases, and the number of virtual blocks per page increases. In accordance with the present invention, the page length P of the expansion memory space is variable, being controlled, for example, by a jumper selectable on the memory expansion unit 90 to be either 1K, 2K or 4K words per page. As will be described in more detail hereinafter in conjunction with a preferred embodiment of the invention, page size selection may also be accomplished by selection of address bits from the bus using standard switching signals controlled by the CPU on the basis of software. However, the "word in block" information remains the same, since the block size is fixed.

The "virtual page" bits of the address received in the memory expansion unit 90 are used to address a mapping register (RAM address) to find the starting block number in physical memory. Each virtual memory page is mapped into the same number of locations in physical memory. The mapping register for each virtual memory page specifies the starting block location of each virtual memory page in physical memory. The starting block number thus derived, consisting of fourteen bits, is then added to the "virtual block in page" bits from the address received on the unified bus 30 to provide a number which specifies the fourteen most significant address bits required to access each of the 16.384 blocks of physical memory. The six least significant bits of the address received on the unified bus apply directly to the corresponding six least significant bits of the physical memory.

Figure 3:
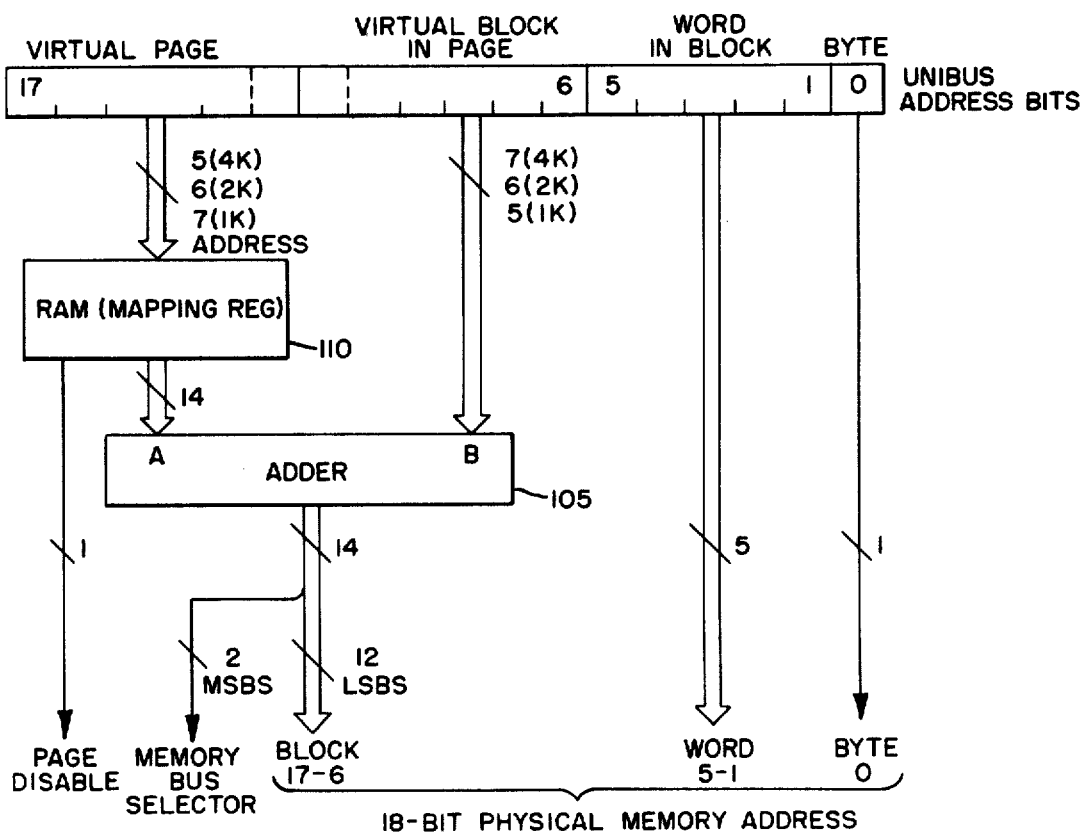
FIG. 3 is a block diagram of the address manipulation involved in generation of an expanded memory address.
Figure 4:
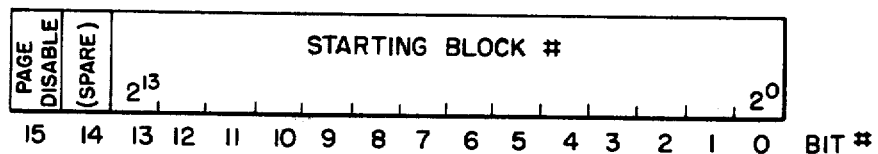
FIG. 4 is a diagram of the mapping register format.

FIG. 3 illustrates the mapping technique adopted by the present invention for expansion of the address received on the unified bus 30. The five, six, or seven most significant bits of the address (depending on the selected page size) are applied to a mapping register 110, which may form part of a random access memory (RAM). The mapping register 110 stores the starting block number information of the physical address and is configured 128 words by 16 bits (2K bits). The mapping register 110 is capable of being loaded and read by the central processing unit 10, with each location being considered as a separate register with sequential addresses in the 4K word unified bus peripheral device address space. Thus, if the mapping register 110 is configured for 1K words per page, the 128 words in the register 110 correspond to, in order, the starting block number in physical memory of 128 1K pages of virtual address space. The format of a mapping register word is as shown in FIG. 4.

The five, six, or seven bits representing the "virtual block in page" (depending on the selected page size) are applied to one input of an adder 105, the second input of which receives the starting block number information from the mapping register 110. The fourteen bits from the output of the adder 105 provide a total addressable range of 512K words, and the two most significant bits from the adder output are used by the timing logic to determine which of the four expansion memory units M1–M4 are to be accessed.

Bit 15 from the output of the mapping register 110 forms a "page disable" bit which is used to inactivate pages which are not to be mapped into the expansion memory. The memory expansion unit does not access memory nor assert any control on the unified bus when the page disable bit is at logic "1". The memory expansion unit also ignores any bus activity if the bus address is in the range of 124K to 128K, which addresses are reserved for the peripheral device registers including mapping registers in the unit itself.

Thus, as seen in FIG. 3, an eighteen bit physical memory address is provided at the output of the mapping logic comprising bit 0 designating the byte, bits 1–5 designating the word in block, and bits 6–17 designating the block in memory. Two additional bits are also provided for selecting the particular one of the four expansion memory units M1–M4 to which the physical address and control is to be applied at the output of the unit 90.

Figure 5:
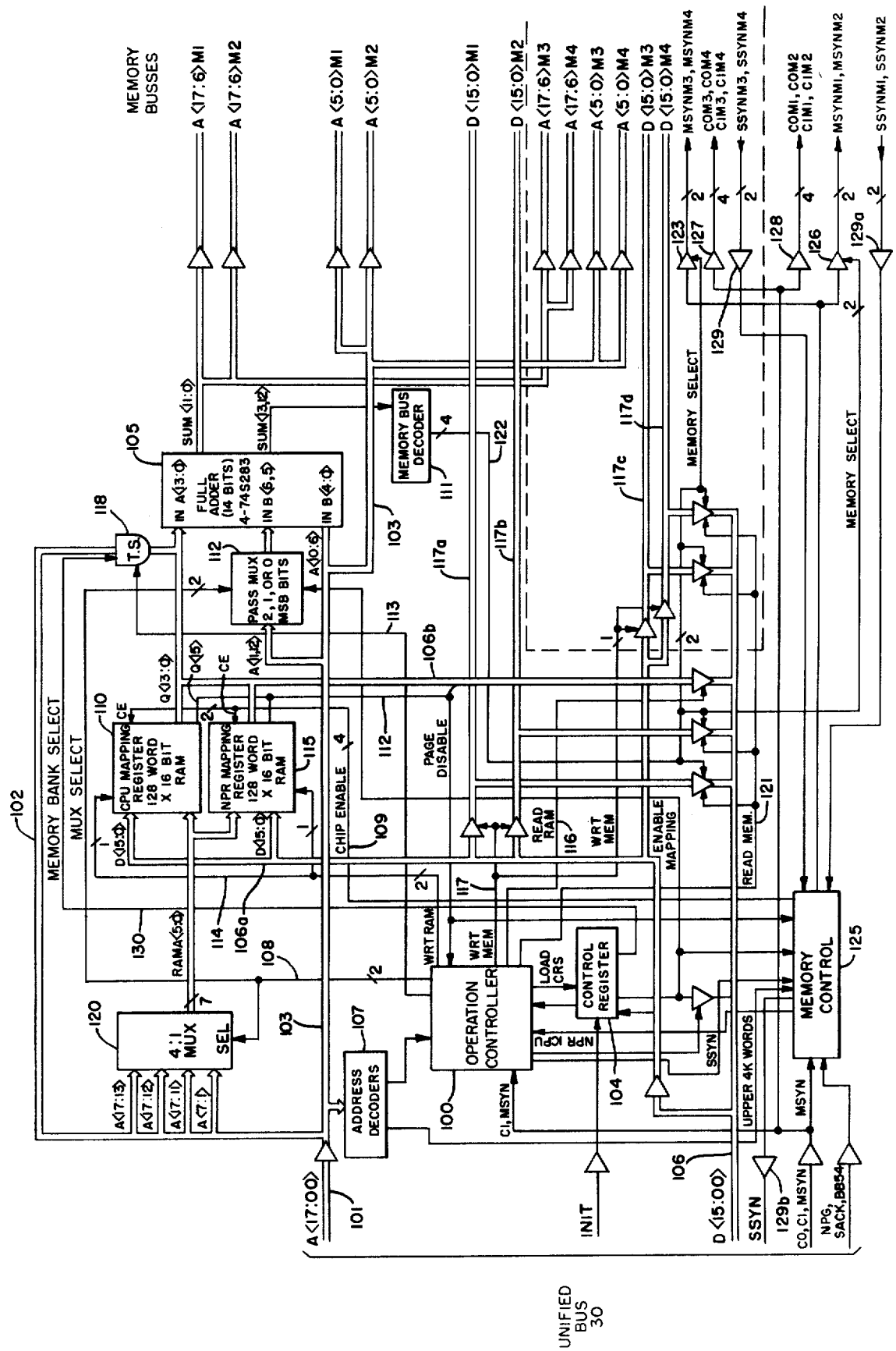
FIG. 5 is a schematic block diagram of the memory expansion unit of the present invention.

It is sometimes desirable for purposes of economy and efficiency in operation of the system to allocate the memory space differently for use by the CPU 10 than is provided for use by the nonprocessor (peripheral) units connected to the unified bus 30. This is accomplished in accordance with the present invention by applying a different mapping table and/or a different page size to each type of requesting source. For this purpose, as seen in FIG. 5, the memory expansion unit 90 comprises two mapping registers for storing starting block number information, i.e., a CPU mapping register 110 and an NPR mapping register 115. When the central processing unit 10 is accessing memory, the CPU mapping register 110 is used to generate the physical memory address. When an NPR device (disc or other DMA bus master) is accessing memory, the NPR mapping register 115 is used to generate the physical address. Determination of which mapping register to be used is performed by the memory control 125 in dependence on whether the CPU is acting as master or an NPR device is in control of the unified bus.

Either of the mapping registers 110 and 115 may be connected to receive selected address bits from the unified bus by means of a multiplexer 120 to provide 1K, 2K or 4K words per page, as desired, the connections being prescribed by the different "words per page" formats illustrated in FIGS. 2a, 2b, and 2c. In this regard, as already illustrated in FIG. 3, different address bits are connected to RAMs 110 and 115 and to the B input of adder 105 in dependence on the selected page sizes. The selection of the proper address bits to be applied to the mapping registers 110 and 115 is performed by the multiplexer 120, while proper address bit selection at the B input of adder 105 is controlled by an address multiplexer 112. The multiplexers 112 and 120 are controlled by multiplex select signals received on line 108 from operation controller 100 on the basis of data from the CPU 10 which is stored in the control register 104.

All eighteen address bits (00–17) are received from the unified bus on address bus 101 and are supplied to selected inputs of the multiplexers 112 and 120, the B input of adder 105, and a bypass control gate 118. In addition, data is received from the unified bus 30 and supplies thereto via bidirectional data bus 106. Thus, data may be supplied from the CPU 10 to the mapping registers 110 and 115 via bus branch 106a and is written into the registers upon enabling of the lead 114 from the operation controller 100. The data stored in the mapping registers 110 and 115 may also be read by the CPU 10 via bus branch 106b upon enabling of the bus driver via lead 116. Also, data may be supplied to the expansion memory units M1-M4 from the CPU 10 via bidirectional memory buses 117a-117d by enabling lead 117 from the controller 100, and data may be similarly received from memory units M1-M4 and supplied to the CPU 10 via bidirectional memory buses 117a-117d by enabling the bus drivers via lead 121.

The operation controller 100 operates on the basis of various address bits received on the address bus 101 and provided by address decoder 107 as well as selected control signals by the unified bus 30, control register 104 and memory control 125 to provide the various internal control signals necessary to perform the various functions provided by the memory expansion unit 90. The control register 104 stores data received from the CPU 10 which determines the type of mapping and designates the required page size as well as controlling certain testing of the memory units M1-M4. The memory control 125 is responsive to control signals on the unified bus to effect selection of the CPU mapping register 110 or the NPR mapping register 115 and also gates the synchronization and cycle control signals MSYN, C0 and C1 to the respective expansion memory units M1-M4 in the absence of a page disable signal on lead 112.

The memory bus decoder 111 receives the two most significant bits at the output of adder 105 and decodes these bits to produce memory select signals which selectively operate gates 123 and 126 (representing plural gates in FIG. 5) to provide the enabling master synchronization signals MSYNM1-MSYNM4 to select a memory unit M1-M4 respectively, which master synchronization signals are suitably delayed prior to being applied to a selected expansion memory unit to permit the memory expansion unit to perform its operation. Drivers 127 and 128 provide the cycle control signals C0 and C1 from the unified bus 30 to the units M1-M4. The slave synchronization signals are returned from memory units M1-M4 via receivers 129 and 129a and are driven onto the unified bus via the slave sync driver 129b.

For proper initialization of the memory expansion unit 90 to enable the mapping feature, the CPU 10 under program control must first set the mapping registers 110 and 115 to the desired values and then load an enable bit into the control register 104. At the time of initialization of the system, and also for the case where the CPU 10 is not programmed for memory expansion, the memory expansion unit will operate in the bypass mode, giving to the CPU the appearance that a single 128K memory unit is connected to the unified bus 30.

Figure 6A:
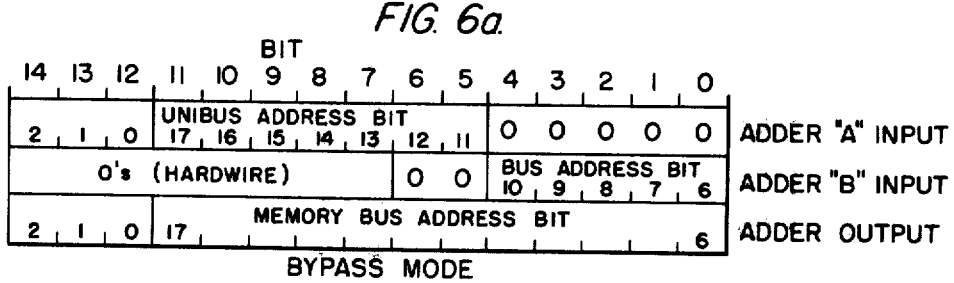
FIGS. 6a-6d are diagrams of the bits assignments for the adder in FIG. 5 for various modes of operation.

Referring to FIGS. 5 and 6a, it is seen that in the bypass mode of operation, the "word in block" bits, which always remain unaltered, are applied on address bus branch 103 directly to the four expansion memory units M1-M4, only one of which will be selected at this time in a manner to be described more fully hereinafter. Also, address bits 6-10 will be applied from address bus 103 directly to the B input of adder 105. Address multiplexer 112 will be controlled at this time from the operation controller 100 via line 108 to supply "0" for address bits 11 and 12 to the B input of adder 105, which is hardwired to supply "0" for bits 7-14 at this input. At the same time, address bits 11-17 are supplied on address bus branch 102 through bypass gates 118 directly to the A input of adder 105 and the address bit leads for bits 0-4 at the outputs of the mapping registers 110 and 115 are forced to "0" at the A input of adder 105 via lead 130 from the control register 104.

Thus, as seen in FIG. 6a, address bits 6-10 at the B input of adder 105 are added to "00000" at the A input thereof, and address bits 11-17 at the A input of the adder 105 are added to "0000000" at the B input thereof. The output of adder 105 thus represents address bits 6-17 without modification, which bits are applied to expansion memory units M1-M4 along with address bits 0-5 received directly on address bus branch 103. However, during the bypass mode only one expansion memory unit, such as unit M1, will be selected automatically by the address bits 12 and 13 which are applied from the output of adder 105 to memory bus decoder 111, so that, insofar as the CPU 10 is concerned, it will appear that a single 128K memory unit is connected to the unified bus.

During the bypass mode of operation, the CPU 10 may load the mapping registers 110 and 115, and upon loading of the enable bit into the control register 104, the memory expansion unit 90 is ready for operation. Also, where the memory expansion function is not desired, the bypass mode of operation provides a single memory unit on the unified bus 30.

Figure 6B:
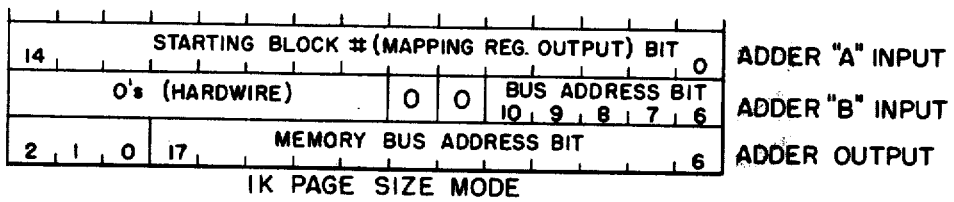

As already indicated, either of the mapping registers 110 and 115 may be connected to the unified bus 30 to provide 1K, 2K or 4K words per page, as desired, the selection being effected by the multiplexers 112 and 120 under control of the operation controller 100. As seen in FIG. 2a, when a mapping register is configured for 1K words per page, the "virtual page" will consist of address bits 11-17 which are applied through the multiplexer 120 to the mapping registers 110 and 115. The "virtual block in page" will be identified by bits 6-10, which are supplied on address bus 103 directly to the B input of adder 105. In this mode, as seen in FIG. 6b, multiplexer 112 provides "00" as bits 11 and 12 to the B input of adder 105, while the remaining bits applied to that input are hardwired to "0".

Figure 6C:
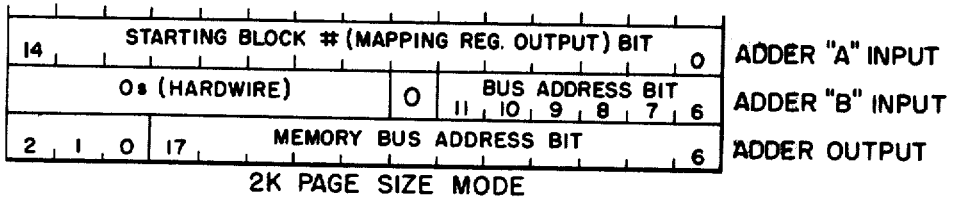
Figure 7:
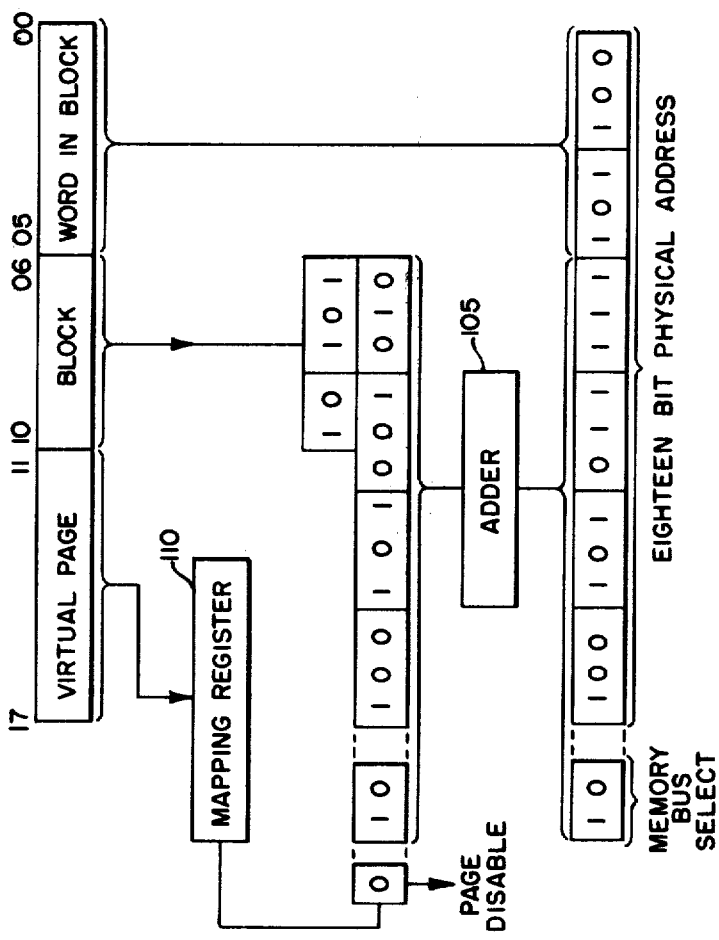
FIG. 7 is a flow chart illustrating the steps of address conversion.

As seen in FIG. 7, the eighteen bit physical address generated by the memory expansion unit 90 includes six bits derived from the original word number in the virtual address, and twelve bits formed by adding the block numbers and the virtual page address obtained from the mapping register identified by bits 11-17 of the virtual address received on the unified bus 30. In addition, the two most significant bits derived from the output of adder 105 form the memory bus selection bits applied to the memory bus decoder 111, while the most significant bit derived from the mapping register forms the page disable bit applied on line 112 to the operation controller 100 and the memory control 125.

Where the mapping register is configured for 2K words per page, as illustrated in FIG. 2b, the "virtual page" will be identified by address bits 12-17 from the unified bus 30 and applied through multiplexer 120 to the mapping registers 110 and 115. The "virtual block in page" will be identified this time by bits 6-11. Bits 6-10 are provided from the address bus branch 103 directly to the B input of the adder 105 while bit 11 is provided through the multiplexer 112 to the B input of the adder 105. As in all cases, bits 0–5, which identify the word in block, are applied directly on address bus branch 103 to the memory units M1–M4. FIG. 6c illustrates the adder bit assignments for this operation.

Figure 6D:
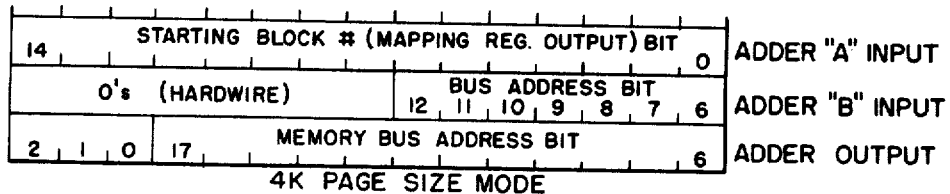

When the mapping registers are configured for 4K words per page, as illustrated in FIG. 2c, the "virtual page" is identified by address bits 13–17, which are applied through the multiplexer 120 to the mapping registers 110 and 115. The "virtual block in page" is identified by bits 6–12 in this case, with bits 6–10 being applied directly to the B input of the adder 105, while bits 11 and 12 are applied from address bus branch 103 through the multiplexer 112 to the B input of the adder 105. FIG. 6d illustrates the adder bit assignments for this operation.

The control register 104 performs various control functions in conjunction with the operation controller 100 and the address decoder 107. FIG. 8a provides a circuit diagram of the control register 104, which consists primarily of a pair of registers 150 and 151 for storing data received from the CPU 10 via the unified bus 30 on leads DATA04 through DATA14. Data is written into the registers 150 and 151 with receipt of the signal SSYN02 via inverter 152 from the operation controller 100, and the data stored in the registers 150 and 151 can be read by the CPU through gates 154–164 in response to the signal SSYN01 applied through gate 153 from the operation controller 100.

Figure 8B:
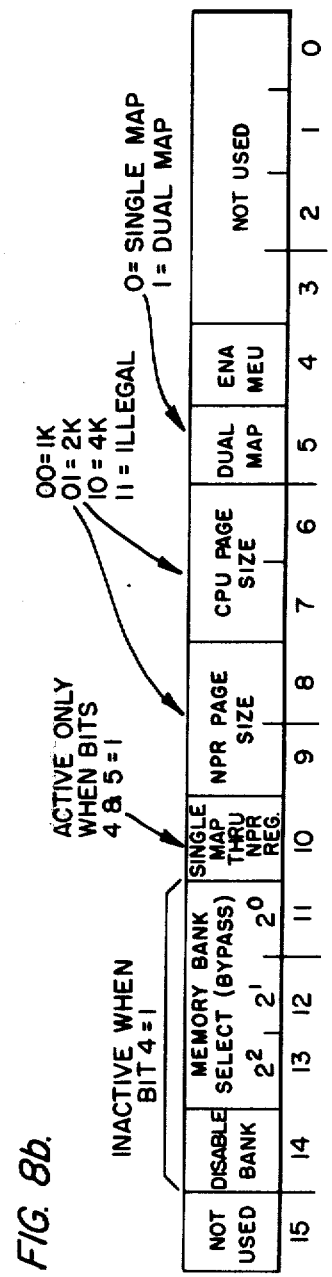
FIG. 8b is a diagram of the control register format.
Figure 8A:
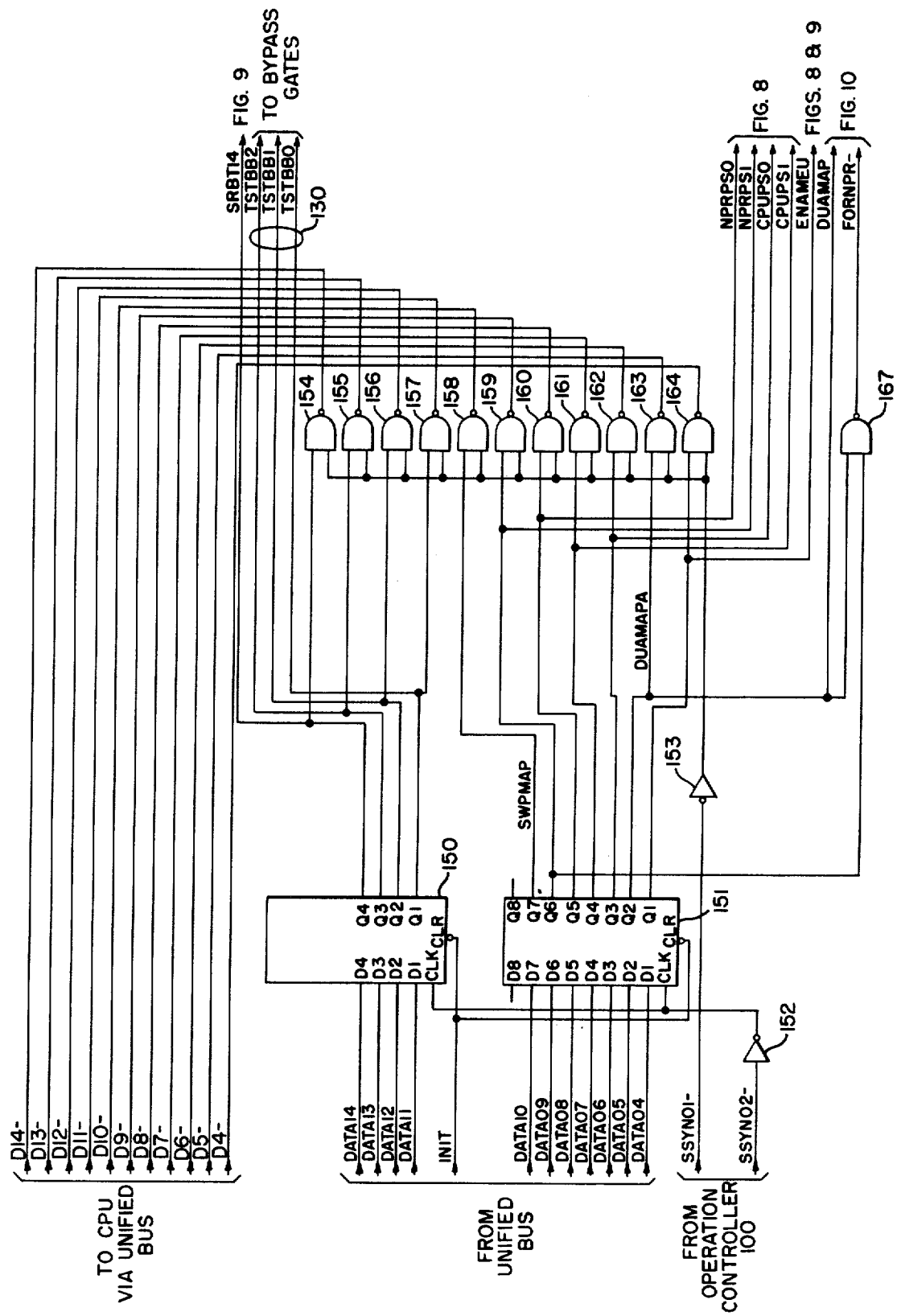
FIG. 8a is a schematic circuit diagram of the control register.

As seen in FIG. 8b, bit 4 in the control register is the enable bit received from the CPU 10 to enable the mapping function in the memory expansion unit. Thus, during initialization when the signal INIT is received on the unified bus 30 and clears the registers 150 and 151, bit 4 will be "0" providing a low (inactive) on lead ENAMEU from the register 151 through inverter 165 (FIG. 9) to enable gate 166 in the operation controller 100, which will initiate the bypass mode by asserting the enable bypass gate signal ENABPG on lead 113. When bit 4 in the control register 104 is "1", the memory expansion unit 90 is enabled for operation.

Bit 5 in the control register 104 determines whether the memory expansion unit will operate in the single mapping mode or the dual mapping mode. If bit 5 is "0" the unit will operate in the single mapping mode; whereas, if bit 5 is "1" the unit will operate in the dual mapping mode. Page size for the respective mapping modes is determined by bits 6 through 9 in the control register. Bits 6 and 7 determine the CPU page size, while bits 8 and 9 determine the NPR page size. If the unit is in the single mapping mode as indicated by bit 5 in the control register 104, the page size will be controlled by bits 6 and 7. Thus, bit 5 in the register 151 and FIG. 8a will control the lead DUAMAP to the memory control 125 to control the mapping selection, as will be indicated in more detail hereinafter. Bits 6 and 7 will control the leads CPUPS0 and CPUPS1 at the output of register 151 to designate the CPU page size, while bits 8 and 9 will control the leads NPRPS0 and NPRPS1 at the output of register 151 to indicate the NPR page size.

Bits 10 through 14 in the control register 104 are provided for test purposes only and therefore will always be "0" for normal operation of the memory expansion unit. For test purposes, it may be desirable to force mapping during the dual mapping mode through the NPR mapping register 115. The CPU 10 may accomplish this by setting bit 10 in the control register 104 to "1", resulting in the enabling of gate 167 in FIG. 8a provided bit 5 is at "1". This enables lead FORNPR which is applied to the memory control 125 to effect enabling of the NPR mapping register 115, in a manner to be described more fully hereinafter.

During the bypass mode of operation, as already described, a single memory unit will be selected for connection to the unified bus 30, such as the expansion memory unit M1. This is accomplished during initializatiion when registers 150 and 151 are cleared and bits 11–13 are "0". Leads TSTBB0–TSTBB2 which extend to the bypass gates 118 then force the memory bus select bits at the output of adder 105 to select unit M1. However, for test purposes, the system may select one of the other expansion memory units M2–M4 in accordance with the state of bits 11–13 in the control register. Thus, during the bypass mode, with bit 4 of the control register at "0", the bypass gates 118 will cause the most significant bits at the output of full adder 105 to designate one of the expansion memory units M2–M4 via the memory bus decoder 111.

Bit 14 in the control register, when set to a "1", is used to disable (force to "0") bits 11–13 of the control register if the address on the unified bus 30 is below 16K. This allows a prgram to be transferred to an upper bank of memory. Thus, enabling of lead SRBT 14 in FIG. 8a will cause gate 189 in FIG. 9 to be enabled when leads ADRS15–ADRS17 represent an address below 16K. Lead INH16K will then inhibit lead 130 to the bypass gates 118, which forces the selection of memory unit M1.

FIG. 9 illustrates a portion of the operation controller 100 as well as the address decoder 107. This portion of the operation controller 100 serves to generate the selection signals applied on lead 108 to the multiplexer 112 and 120, as well as the write RAM and read RAM signals which control data flow to and from the registers 110 and 115 and the write and read clock signals for the control register 104.

When the memory expansion unit is enabled by the CPU 10 placing the enable bit in the control register 104, the memory control 125 will indicate on the basis of control signals received on the unified bus 30 whether the CPU mapping register 110 or the NPR mapping register 115 is to be utilized by enabling either the lead CPUACC to the input of AND gates 168 and 169 in FIG. 9 or by enabling the lead NPRACC to the input of AND gates 170 and 171. Gate 168 will pass the page selection signal CPUPS0, while the gate 169 will pass the page selection signal CPUPS1. In the same manner, gate 170 will pass the page selection signal NPRPS0, while the gate 171 will pass the page selection signal NPRPS1. Thus, the multiplex selection signals MUXSE0 and MUXSE1 at the output of OR gates 172 and 173 will provide the selection signals on lead 108 for controlling the multiplexers 112 and 120 to provide the proper address bits to the mapping registers 110 and 115 and to the adder 105 in accordance with the page selection.

The chip enable signals which enable the mapping registers 110 and 115 are generated from the output of the address decoder 107, as seen in FIG. 9. The signals NPRRWR and NPRRRD provide for the writing and reading of the NPR mapping register 115, while the leads CPURWR and CPURRD provide for control of the writing and reading of the CPU mapping register 110. The lead MRRDWR provides for mapping register read or write enabling. The actual chip enable signals are generated by the portion of the operation controller 100 illustrated in FIG. 10. The CPU mapping register and NPR mapping register access control signals CPUACC and NPRACC are received at the input of gates 174 and 175 from the memory control 125 along with the mapping register read or write enabling signal MRRDWR. The read and write control signals NPRRRD, NPRRWR, CPURRD and CPURWR for the NPR and CPU mapping registers 110 and 115 from FIG. 9 are also applied to AND gates 177-180, which also receive the outputs of gates 174 and 175. Gate 176 receives the mapping register read or write enabling signal MRRDWR along with the memory expansion unit enabling signal ENAMEU, the output of which is also applied to gates 177-180. The most significant bit at the output of multiplexer 120 is provided on lead MUXMSB to gate 177 and through inverter 195 to gate 178. The chip enable signals for the respective registers 110 and 115 are then provided on the leads ECPUMU, ECPUML, ENPRMU, and ENPRML, which are applied on lead 109 to the mapping registers 110 and 115. Four signals are required because each mapping register is comprised of two sections each 64 words in length. One-half is referred to as "upper" and the other as "lower".

Referring once again to FIG. 9, the master synchronization signal MSYN from the unified bus 30 is applied to shift register 168 along with a clock signal on lead 17R5MH from the memory control 125. The output Q2 of the register 168 is applied to each of the AND gates 181-184. The gates 181 and 182 also receive signals CRWRIT and CRREAD, respectively, from the address decoder 107 and provide the synchronizing signals SSYNO2 and SSYNO1 at the outputs thereof, which extend to the control register 104 in FIG. 8a, and which are ORed together with other slave sync sources to assert slave sync on the unified bus. The AND gates 183 and 184 receive the Q4 output from the register 168 via inverter 185 and selected outputs from the address decoder 107 via inverters 186 and 187, and these gates provide at their outputs the write RAM signals WRTCPU and WRTNPR on lead 114 which control the writing of data into the mapping registers 110 and 115. A read RAM signal ENARAM for controlling the data gates during reading of the mapping registers 110 and 115 is supplied at the output of gate 188 onto lead 116 in response to outputs of the register 168 and the Q2 output of the address decoder 107.

The address decoder 107 also detects address above 124K, which are reserved for peripheral device registers including mapping registers in the memory expansion unit itself, enabling lead TOP4KW at the output of gate 190, which prevents the memory control 125 from extending the master synchronization signals MSYN-1-MSYN4 to the expansion memory units M1-M4 or from asserting SSYN on the unified bus 130. This is also true when the page disable bit is generated on lead 112 from the mapping registers 110 and 115 for pages which have memory plugged into the unified bus directly.

As already indicated, either the CPU mapping register 110 or the NPR mapping register 115 in the memory expansion unit 90 will be enabled depending upon whether the CPU or a peripheral unit has control over the unified bus 30. This determination is made by the memory control 125 in response to detection of the control signals appearing on the unified bus 30, on the basis of which control over the unified bus is obtained by one of the devices connected thereto. For example, in the unified bus system described more particularly in the above-identified U.S. Pat. No. 3,710,324, a priority structure determines which device has control over the bus at any given instant of time so that every device capable of becoming bus master has an assigned priority. When two devices request the bus at the same time, the device with the higher priority will receive control first.

Figure 11:
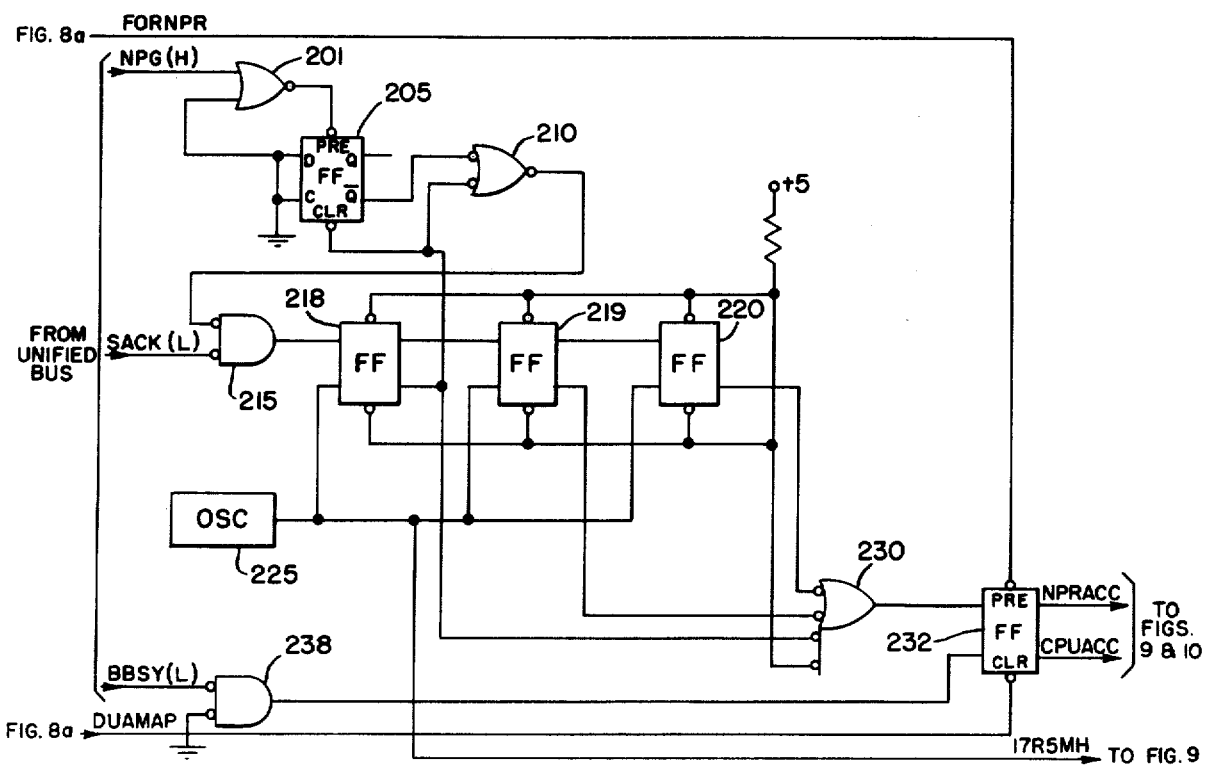
FIG. 11 is a schematic diagram of the memory control.
Figure 12:
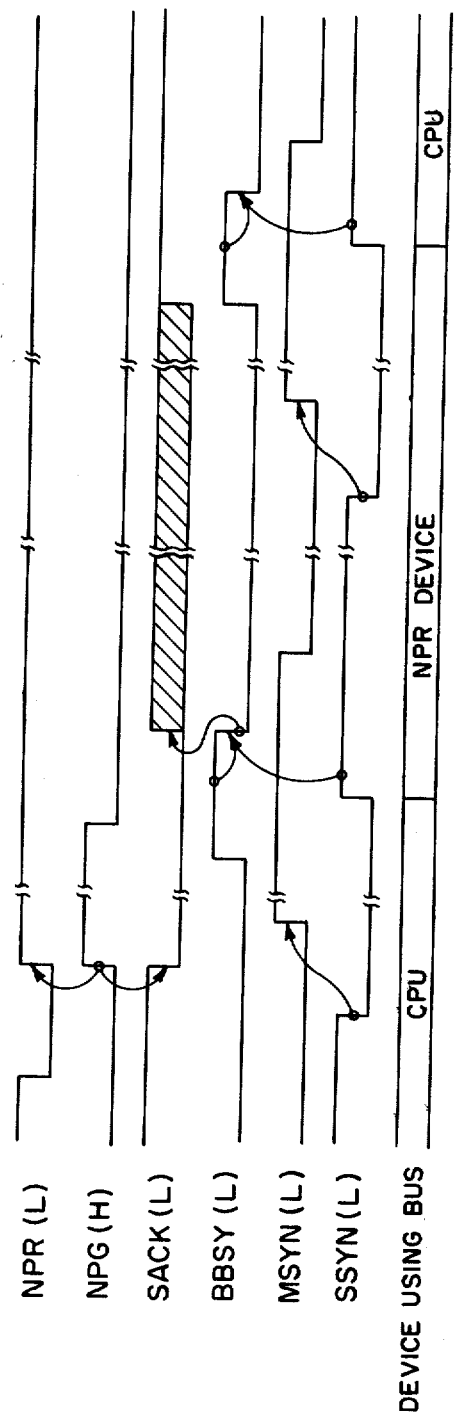
FIG. 12 is a waveform diagram for use in explaining the operation of the present invention.

An example of the memory control 125 applicable to use with a unified bus system of the type described in the above-identified U.S. Pat. No. 3,710,324 will be described in connection with FIG. 11, which illustrates the logic provided to determine whether the CPU or an NPR device is accessing the memory. One of the features of the present invention is the fact that the unified bus is not "broken" in making the determination of which type of device is accessing the memory. This is accomplished by monitoring the non-processor grant (NPG), selection ackowledgement (SACK), and bus busy (BBSY) signals appearing on the unified bus 30. A timing diagram of these signals is provided in FIG. 11, which also includes the non-processor request signal (NPR), the master synchronization signal (MSYN), and the slave synchronization signal (SSYN) available on the unified bus in the referenced system.

The memory expansion unit 90 assumes that the central processing unit 10 is accessing memory at all times, except when it detects that (1) the non-processor grant signal (NPG) is activated, (2) the selection ackowledgement signal (SACK) indicates that the slave will take the bus next, and (3) the bus busy signal (BBSY) is deactivated, thus signaling the end of the CPU access to the bus. As soon as the slave synchronization signal (SSYN) is negated, the NPR device asserts its bus busy signal (BBSY) and begins its access. The NPR device retains control of the unified bus until it negates its bus busy signal (BBSY).

Figure 10:
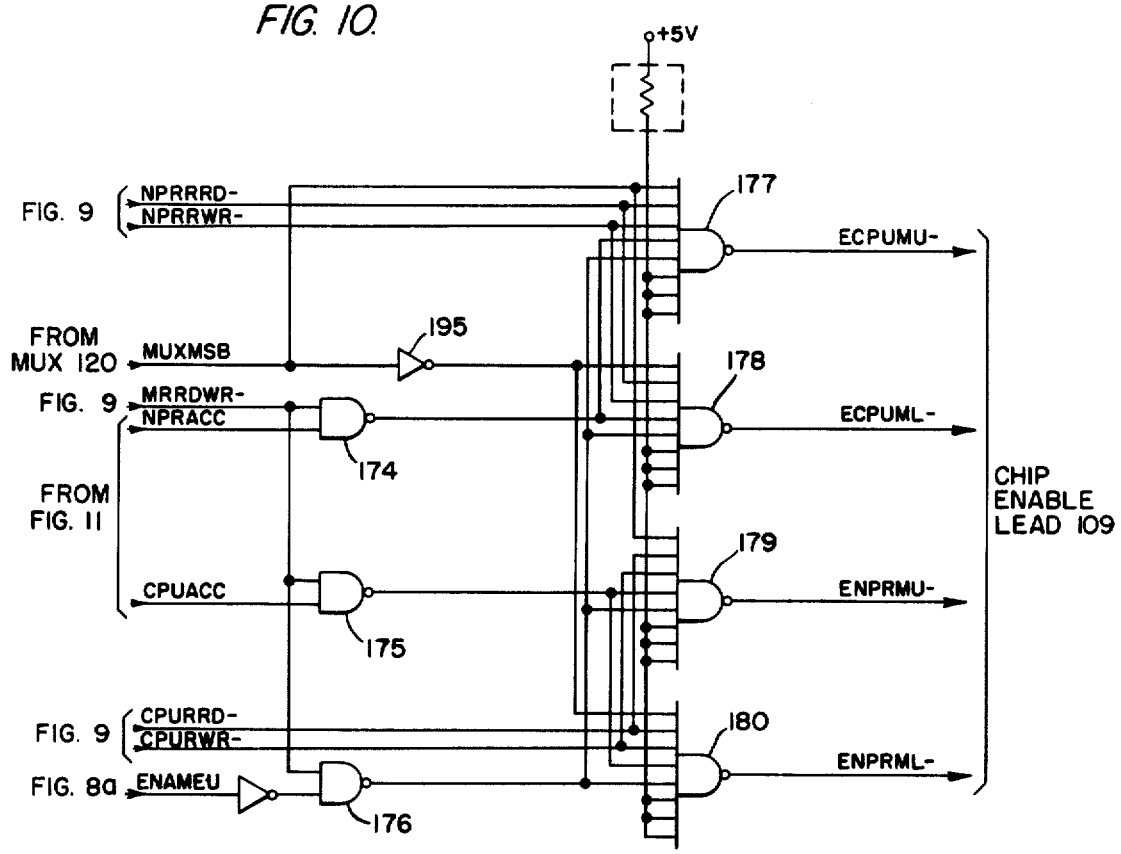

Thus, as seen in FIG. 10, the non-processor grant signal (NPG) is applied through gate 201 to set flip-flop 205, which provides its output through gate 210 to one input of AND gate 215. The other input of AND gate 215 receives the selection acknowledgement signal (SACK) and is enabled thereby to apply an output to a shift register made up of stages 218-220 and driven from oscillator 225. The output of the first stage 218 of the shift register clears the flip-flop 205, and holds gate 210 asserted.

The OR gate 230 is enabled from the shift register to provide an output to set flip-flop 232 on the positive going edge from the output of gate 238, which goes low (inactive) when the bus busy signal (BBSY) is deactivated at the end of CPU access. The Q output of flip-flop 232 is active (high) when an NPR device has gained control of the bus, but remains disabled at all other times, such as when the CPU has control of the bus. The output signals CPUACC and NPRACC from flip-flop 232 are applied to the control register 104 and operation controller 100 to enable generation of the multiplexer selection signals for controlling the multiplexers 112 and 120, as seen in FIG. 9, and to enable generation of the chip enable signals for the mapping registers 110 and 115, as seen in FIG. 10.

Thus, the memory expansion unit in accordance with this invention not only provides for increased memory capacity in a unified bus system in a relatively simple manner, but also makes available dual mapping of the expansion memory space so as to allocate that space differently for the central processing unit and the DMA units connected to the unified bus.

While we have shown and described several embodiments in accordance with the present invention, it is understood that the same is not limited thereto but is susceptible of numerous changes and modifications as known to those of ordinary skill in the art, and we therefore do not wish to be limited to the details shown and described herein but intend to cover all such changes and modifications as are obvious to one skilled in the art.

What is claimed is:

1. In a data processing system including an I/O bus having a plurality of conductors for carrying both data and address signals; a plurality of I/O devices including devices forming physically addressed storage locations connected to said bus in parallel, each of said I/O devices being assigned to a respective address slot consisting of a predetermined block of the available addresses on said bus; a central processor unit for processing a program stored in at least one of said storage locations, the addresses of said storage locations being divided into first, second, and third portions; and address conversion means connected in series between said central processor unit and said bus for transmitting onto the bus, in response to a virtual address from said central processor unit, a physical address for selecting a storage location; the improvement comprising a plurality of expansion memory units providing a total number of memory locations exceeding the number of physical addresses making up an address slot on said bus;

a memory expansion unit connected to said bus in parallel with said I/O devices and having an address slot assigned thereto for converting the block of physical addresses corresponding to said address slot on said bus into an expanded range of physical addresses for selecting said memory locations in said expansion memory units; and means for connecting the respective expansion memory units to said memory expansion unit;

said memory expansion unit including a mapping register in the form of a random access memory storing the base physical address for a block of consecutively addressed memory locations, said mapping register being responsive to the first portion of said physical address received from said bus for reading out a selected base physical address; and adder means for combining the output of said mapping register and the second portion of the physical address received from said bus to produce an intermediate address; at least a portion of said intermediate address juxtaposed with the third portion of said physical address received from said bus being forwarded to said expansion memory units as an expanded physical address.

2. A data processing system as defined in claim 1 wherein said memory expansion unit further includes operation controller means responsive to said central processor unit for determining the allocation of address bits received on said bus to said first, second and third portions of said physical address; and address multiplexer means responsive to said operation controller means for selectively applying to said mapping register those address bits on said bus which make up said first portion of said physical address.

3. A data processing system as defined in claim 2 wherein said address multiplexer means includes means connected to said adder means for supplying from said bus address bits of the second portion of said physical address not allocated to the first portion thereof in accordance with the determination of said operation controller means.

4. A data processing system as defined in claim 3 wherein said memory expansion unit further includes bypass gate means responsive to said operation controller means for applying the first portion of said physical address directly from said bus to the input of said adder means bypassing said mapping register in response to control from said central processor unit.

5. A data processing system as defined in claim 1 wherein said means for connecting the respective expansion memory unit comprises a plurality of expansion memory buses and wherein said memory expansion unit further includes memory selector means responsive to at least one selected bit of said intermediate address for enabling a designated one of said expansion memory buses.

6. A data processing system as defined in claim 5 wherein said memory expansion unit further includes means responsive to a selected bit of the base physical address derived from said mapping register designating a selected block of physical addresses for selectively inhibiting said memory selector means.

7. A data processing system as defined in claim 1 wherein said memory expansion unit includes first and second mapping registers in the form of random access memories each storing base physical addresses for the block of physical addresses allocated to the storage location formed by said memory expansion unit, said first and second mapping registers each being responsive to different length first portions of said physical addresses received from said bus for reading out a selected base physical address; expanded address generating means connected to said bus and said mapping registers for combining said selected base physical address with the second and third portions of the physical address received from said bus into an expanded physical address and for applying said expanded physical address to said expansion memory units.

8. A data processing system as defined in claim 7 wherein said memory expansion unit further includes memory control means responsive to control signals applied to said bus by said central processor unit and said I/O devices connected to said bus for enabling said first mapping register only when said central processor unit is in control of said bus and for enabling said second mapping register only when an I/O device connected to said bus is in control of said bus.

9. A data processing system as defined in claim 8 wherein said means for connecting the respective expansion memory unit comprises a plurality of expansion memory buses and wherein said memory expansion unit further includes memory selector means responsive to at least one selected bit of said address for enabling a designated one of said expansion memory buses.

10. A data processing system as defined in claim 9 wherein said memory expansion unit further includes operation controller means responsive to said central processor unit for determining the allocation of address bits required on said bus to said first, second, and third portions of said physical address; and address multiplexer means responsive to said operation controller means for selectively applying to said mapping register those address bits on said bus which make up said first portion of said physical address.

11. A data processing system as defined in claim 10 wherein said address multiplexer means includes means connected to said adder means for supplying from said bus address bits of the second portion of said physical address not allocated to the first portion thereof in accordance with the determination of said operation controller means.

12. A data processing system as defined in claim 11 wherein said memory expansion unit further includes means for applying the address bits corresponding to the third portion of said physical address from said bus directly to said expansion memory units.

13. A data processing system as defined in claim 12 wherein said memory expansion unit further includes bypass gate means responsive to said operation controller means for applying the first portion of said physical address directly from said bus to the input of said adder means bypassing said mapping register in response to control from said central processor unit.

14. In a data processing system including an I/O bus having a plurality of conductors for carrying both data and address signals; a plurality of I/O devices including devices forming physically addressed storage locations connected in parallel to said bus, each of said I/O devices being assigned to a respective address slot consisting of a predetermined block of the available addresses on said bus; and a central processor unit for processing a program stored in at least one of said storage locations, the addresses of said storage locations being divided into first, second, and third portions; the improvement comprising a plurality of expansion memory units providing a total number of memory locations exceeding the number of physical addresses making up an address slot;

a memory expansion unit connected in parallel with said I/O devices and having an address slot assigned thereto for converting the block of physical addresses corresponding to said address slot on said bus into an expanded range of physical addresses for selecting said memory locations in said expansion memory units, including means for generating a different set of expanded physical addresses in response to addresses received on said bus from said central processor unit than the set generated in response to addreses received on said bus from one of said I/O devices connected to said bus; and means for connecting the respective expansion memory units to said memory expansion unit.

15. A data processing system as defined in claim 14 wherein said memory expansion unit includes a mapping register in the form of a random access memory storing base physical addresses for a block of consecutively addressed memory locations, said mapping register being responsive to the first portion of said physical address received from said bus for reading out a selected base physical address; adder means for combining the output of said mapping register and the second portion of the physical address received from said bus to produce an expanded physical address to be forwarded to said expansion memory units.

16. A data processing system as defined in claim 15 wherein said memory expansion unit further includes bypass gate means for applying the first portion of said physical address directly from said bus to the input of said adder means bypassing said mapping register in response to control from said central processor unit.

17. A data processing system as defined in claim 15 wherein said means for connecting the respective expansion memory unit comprises a plurality of expansion memory buses and wherein said memory expansion unit further includes memory selector means responsive to at least one selected bit of said expanded physical address for enabling a designated one of said expansion memory buses.

18. A data processing system as defined in claim 17 wherein said memory expansion unit further includes operation controller means responsive to said central processor unit for determining the allocation of address bits received on said bus to said first, second, and third portions of said physical address; and address multiplexer means responsive to said operation controller means for selectively applying to said mapping register those address bits on said bus which make up said first portion of said physical address.

19. A data processing system as defined in claim 18 wherein said address multiplexer means includes means connected to said adder means for supplying from said bus address bits of the second portion of said physical address not allocated to the first portion thereof in accordance with the determination of said operation controller means.

20. A data processing system as defined in claim 19 wherein said memory expansion unit further includes means for applying the address bits corresponding to the third portion of said physical address from said bus directly to said expansion memory units.

21. A data processing system as defined in claim 15 wherein said memory expansion unit includes first and second mapping registers in the form of random access memories each storing base physical addresses for the block of physical addresses allocated to the storage location formed by said memory expansion unit, said first and second mapping registers each being responsive to different length first portions of said physical addresses received from said bus for reading out a selected base physical address; expanded address generating means connected to said bus and said mapping registers for comining said selected base physical address with the second and third portions of the physical address received from said bus into an expanded physical address.

22. A data processing system as defined in claim 21 wherein said control means includes means responsive to control signals applied to said bus by said central processor unit and said devices connected thereto for enabling said first mapping register only when said central processor unit is in control of said bus and for enabling said second mapping register only when a device connected to said bus is in control of said bus.

* * * * *